Aug. 4, 1959     H. A. LOZEAU     2,898,539

BATTERY CHARGING APPARATUS

Filed July 3, 1956

Inventor
Homer A. Lozeau
by W. R. Hulbert
Atty.

United States Patent Office 2,898,539
Patented Aug. 4, 1959

2,898,539

BATTERY CHARGING APPARATUS

Homer A. Lozeau, Worcester, Mass., assignor to Koehler Manufacturing Company, Marlboro, Mass., a corporation of Massachusetts Application July 3, 1956, Serial No. 595,671

1 Claim. (Cl. 320—32)

This invention relates generally to battery charging apparatus, and more particularly it relates to the control and indication of the current in such apparatus according to the condition of a storage battery under charge thereby.

In the process of restoring charge to a battery, it is well known that unless the charging current caused to flow through the battery is materially decreased or cut-off altogether as the battery approaches a fully charged state, harmful effects on the battery may result. Although with most chargers the increase in battery voltage, which takes place as charge is restored, tends to limit the charging current to some extent, insufficient reduction of the charging current is produced in this way to avoid entirely the harmful effects of overcharging. Therefore, it has been proposed, especially in commercial applications of battery chargers, to provide means for automatically reducing (tapering) the current as charge is restored, but use of systems of this type has so far been limited because of their complexity and cost.

It is an object of this invention to provide a relatively simple and trouble free arrangement for tapering the charging current supplied to a battery so as to eliminate any possibility of damaging the battery by overcharging.

It is another object of the invention to provide in combination with apparatus adapted to operate in the above described manner, means for indicating the condition of a battery under charge.

The novel features of the invention, together with further objects and advantages thereof, will become more readily apparent when considered in connection with the accompanying drawing wherein.

Figure 1:
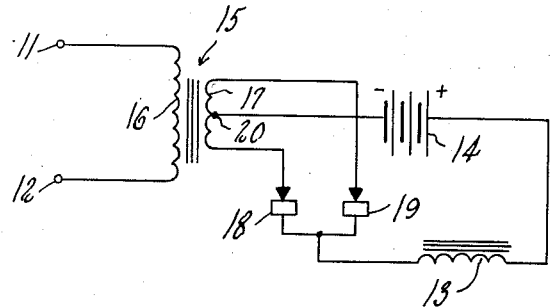
Fig. 1 is a schematic diagram of battery charging apparatus according to the invention.

Referring first to Fig. 1, it will be observed that the apparatus according to the invention includes a full-wave rectifier circuit supplied with alternating current from a pair of terminals 11 and 12, and a saturable core inductor 13 connected between the rectifier circuit and a battery 14 to be charged. In particular, the rectifier circuit is constituted by a step-down transformer 15, having its primary winding 16 connected to terminals 11, 12, and its secondary winding 17 connected to one each of the terminals of a pair of rectifier elements 18 and 19 in conventional full-wave fashion. The remaining terminals of the rectifier elements which are common to one another and a center tap 20 of secondary winding 17 constitute the output of the rectifier circuit. Thus, saturable core inductor 13 is connected in series with battery 14 between the center tap 20 and the common terminals of the rectifier elements.

As is conventional in battery charges, the rectifier circuit serves more like a voltage source rather than a current source in that the amount of current supplied thereby is dependent at least in part upon the characteristics of the load. To change the characteristics of the load as the battery becomes charged, and thereby reduce or taper the amount of charging current caused to flow in the circuit, inductor 13 is so proportioned with respect to the size of its core and the number of turns thereon that the core becomes saturated when the battery is in a discharge state, and the charging current is high, but unsaturates when the battery approaches a fully charged state and the charging current is reduced by the back voltage of the battery itself. In this regard, those skilled in the art will appreciate that, owing to the fact that the supply voltage is a pulsating one, the core of inductor 13 does not remain completely saturated even when the charging current is a maximum. Rather, what is significant is that when the battery is in a discharged state, enough current is caused to flow through the winding of the inductor so that its core becomes saturated for the greater part of each pulse cycle. Under these conditions, it follows that inductor 13 will have relatively little effect on the charging current, particularly since the ohmic resistance of the winding is purposely kept relatively small. As the battery regains its charge, however, increasingly less current flows in the circuit because of the increased back voltage of the battery itself with the result that inductor 13 becomes saturated for a lesser and lesser part of each pulse cycle. When the battery reaches a substantially fully charged state, little or no saturation takes place, and the filtering action of the inductor whereby the peak current is caused to more nearly approximate the average current, is at a maximum. Because of such filtering action, the amount by which the peak voltage appearing across the battery exceeds the back voltage of the battery will be appreciably decreased, thereby tapering the charging current relatively sharply.

An illustrative application of the above-described apparatus demonstrates this improved operation. With a discharged lead acid battery of approximately 12 ampere-hour capacity, having two cells, and being charged at an initial two ampere rate, the final charging rate was in the neighborhood of three to five percent of the initial value. An inductor comprising a high permeability core, ¼ by ⅝ inches in cross section, with about 85 to 100 turns thereon was found to be best suited for this application. Under like conditions but with the saturable core inductor omitted, the final charging rate was from 30 to 40 percent of the initial charging rate, which is sufficient to adversely affect the lives of the cells if continued for any length of time.

Figure 2:
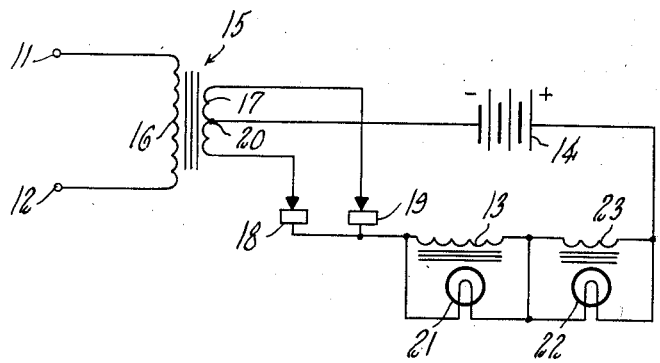
Fig. 2 is a schematic diagram of battery charging apparatus similar to that of Fig. 1 wherein indicating devices to indicate the condition of a battery under charge have been incorporated also in accordance with the invention.

With reference now to Fig. 2, there is illustrated a modified arrangement of the apparatus of Fig. 1 wherein means for indicating the state of charge of the battery have been incorporated. That is to say, in addition to the full-wave rectifier circuit and saturable core inductor 13, there is provided a second inductor 23, serially connected between saturable core inductor 13 and the battery 14; and a pair of indicating lamps 21 and 22. Lamps 21 and 22 are connected across the respective inductors 13 and 23.

Insofar as the operation of this circuit is concerned with tapering the charging current, saturable core inductor 13 functions to limit the peak voltage appearing across the battery, when the battery becomes charged, in precisely the same manner as in the embodiment of Fig. 1. Inductor 23, whose ohmic resistance is also preferably small, plays no part in this function. Rather it is the function of inductor 23 to provide sufficient voltage to light the indicator lamp 22 when the charging current is high, signifying that the battery is discharged, and to provide insufficient voltage to light this lamp when the current approaches a predetermined value, signifying that the battery is substantially fully charged. Conversely, indicator lamp 21, which is connected across saturable core inductor 13 does not light up when the charging current is high because of the fact that the core of inductor 13 will be saturated for the major part of each pulse cycle. In other words, when the core is substantially saturated, there is very little voltage induced across the winding by the ripple component of the charging current. As the charging current tapers off to a value corresponding to the battery having acquired a full charge, however, little or no saturation of the inductor takes place and sufficient voltage is induced across the winding of inductor 13 to light the lamp 21.

Figure 3:
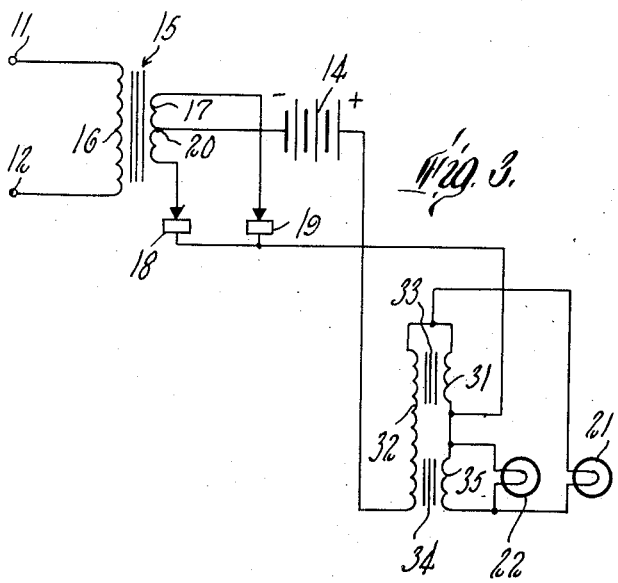
Fig. 3 is a schematic diagram of a modified arrangement of the apparatus of Fig. 2.
Figure 4:
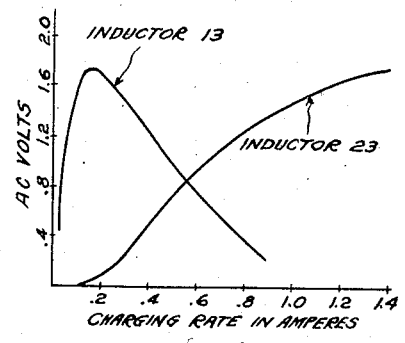
Fig. 4 is a plot of the voltages induced across the inductors in the apparatus of Fig. 2 as a function of frequency.

As will be apparent to those skilled in the art, inductor 23 should not become saturated appreciably, even when the charging current is a maximum, for otherwise the voltage induced thereacross may not decrease sufficiently to extinguish lamp 22 when the charging current is a mininimum. With 2 volt, .06 ampere lamps, for example, an inductor 23 comprising about 25 to 30 turns on a high permeability core whose cross sectional area is 3 or 4 times that of inductor 13 has been found to be optimum for charging a battery of the type aforementioned. The voltage induced across such an inductor as a function of charging current is illustrated in Fig. 4, together with the corresponding voltage-current characteristic associated with inductor 13.

Where core cost is a factor to be reckoned with, certain savings may be realized by the use of a modified arrangement of the apparatus, also adapted to indicate the state of the charge of the battery, as shown in Fig. 3. In Fig. 3, there is connected between the rectifier circuit and the battery a pair of windings 31 and 32, the former being wound on a core 33 and the latter linking core 33 with another core 34 whereon a coil 35 is wound. Lamp 22 corresponding to the lamp of like number in Fig. 2 is connected across coil 35, and lamp 21 corresponding to lamp 21 of Fig. 2 is connected in a series circuit including windings 31 and 35. In this arrangement, selective indication of the state of charge of the battery may be achieved with cores 33 and 34 of the same size as the core of inductor 13 in Figs. 1 and 2. All that is necessary is that coil or winding 31 have a greater number of turns than coil 32 in order to saturate the core 33 without saturating core 34 when the battery is discharged, and a relatively large amount of current is caused to flow in the circuit. Also the windings 31 and 35 must be connected so that the respective voltages induced thereacross oppose one another. A coil 31 having approximately 80 turns, a coil 32 having about 19 turns, and a coil 35 of about 40 turns has been found to work well, for example.

Accordingly, when charging of the battery is begun, lamp 22 will be lighted, assuming that the battery is discharged and the charging current high, because sufficient voltage is induced across the coil 35 by the current in coil 32 to light this lamp. There will be some voltage across coil 31 because the core 33 does not remain completely saturated, as aforementioned, but this voltage is opposed by the voltage induced across winding 35 so that lamp 21 is not lighted. Once the amount of charging current decreases substantially, however, signifying that the battery is approaching a charged condition, the voltage applied to lamp 21 increases sufficiently to light this lamp and the voltage applied to lamp 22 decreases sufficiently to extinguish it. This result follows from the fact that less and less voltage opposing the voltage across coil 31 is induced across coil 35 with decreasing current in the coil 32, whereas more and more voltage is induced across coil 31 by the ripple component of the current, since the core 33 will become unsaturated for an increasingly greater part of each pulse cycle. In other words, the difference voltage associated with coils 31 and 35 controls the lamp 21, whereas the individual voltage of coil 35 controls the lamp 22 such that the lamps are selectively lighted in accordance with the state of charge of the battery.

Various modifications of the above-described embodiments that are within the spirit and scope of the invention will no doubt occur to those skilled in the art. For example, only a single lamp 22 may be employed in conjunction with the saturable core inductor of Fig. 2 or 3 to indicate the condition of a battery under charge, the absence of light being indicative of a charged battery in this case. Therefore, my invention should be deemed to be limited not to the specific embodiments shown by way of illustration in the drawings, but should be deemed to be limited only by the scope of the appended claim.

What is claimed is:

Battery charging apparatus comprising a source of pulsating direct voltage for charging a battery, first and second magnetic cores, first and second windings on said cores, respectively, a third winding linking said cores, said first and third windings being serially connected between said source and the battery to be charged to magnetize said cores and to substantially saturate said first core when the charging current caused to flow through said windings exceeds a predetermined minimum value signifying that the battery is substantially discharged, a first indicating device responsive to the voltage induced across said second winding by an amount of charging current exceeding said predetermined minimum value, and a second indicating device responsive to the voltage difference between the voltages induced across said first and second windings by an amount of charging current substantially equal to said predetermined value signifying that the battery is substantially fully charged.

References Cited in the file of this patent

UNITED STATES PATENTS

| | | |
|---|---|---|
| 1,716,798 | Schmidt | June 11, 1929 |
| 1,717,563 | Hull | June 18, 1929 |
| 1,802,483 | Siragusa | Apr. 28, 1931 |
| 2,101,407 | Morland | Dec. 7, 1937 |
| 2,286,101 | Norberg et al. | June 9, 1942 |
| 2,324,188 | Beetem | July 13, 1943 |
| 2,341,446 | Klinkhamer et al. | Feb. 8, 1944 |
| 2,377,180 | Pohm | May 29, 1945 |
| 2,383,722 | Haug | Aug. 28, 1945 |
| 2,423,134 | Winkler | July 1, 1947 |
| 2,431,312 | Cronvall | Nov. 25, 1947 |
| 2,505,620 | John et al. | Apr. 25, 1950 |
| 2,600,249 | Klinkhamer | June 10, 1952 |

FOREIGN PATENTS

| | | |
|---|---|---|
| 556,170 | France | Apr. 9, 1923 |